United States Patent [19]

Bottles

[11] 3,904,110

[45] Sept. 9, 1975

[54] LARGE MARK TOLERANCE CARD READER

[75] Inventor: David M. Bottles, Long Beach, Calif.

[73] Assignee: Compucorp, Los Angeles, Calif.

[22] Filed: July 27, 1973

[21] Appl. No.: 383,170

[52] U.S. Cl. .......................... 235/61.11 E; 250/555
[51] Int. Cl. .......................... G06k 7/10; G08c 9/06
[58] Field of Search ....... 235/61.11 E; 250/555, 566

[56] References Cited

UNITED STATES PATENTS

| | | | |
|---|---|---|---|
| 3,780,270 | 12/1973 | Faulkner et al. | 235/61.11 E |
| 3,801,776 | 4/1974 | Goeppinger et al. | 235/61.11 E |

*Primary Examiner*—Daryl W. Cook
*Attorney, Agent, or Firm*—Lindenberg, Freilich, Wasserman, Roser & Fernandez

[57] ABSTRACT

A card reader which can reliably detect the presence of marks within designated boxes printed on the cards even though the marks may have a thickness much less than that of the boxes and may occupy a wide variety of positions within the boxes. The reader includes a row of light sensors, each sensing light within a card region much narrower than the markable boxes on the card, a group of memories with each memory being set when a corresponding sensor detects a mark, and a timing system for reading out the memories and then resetting them after each column of boxes passes by the sensors. The card has preprinted strobe markings staggered with respect to the columns of markable boxes, and the timing system includes a strobe mark sensor for reading out the memories and resetting them each time a strobe mark is sensed.

8 Claims, 7 Drawing Figures

LARGE MARK TOLERANCE CARD READER

BACKGROUND OF THE INVENTION

This invention relates to card readers.

Mark card readers permit a person to encode a card by placing a pencil or pen mark within small preprinted boxes on the card, instead of requiring that the card be punched. If there is assurance that each mark will occupy a large portion of its box, then the marks can be reliably detected by card readers similar to ordinary punch-card readers, and that are modified to sense reflected light. Such a mark card reader employs a row of sensors that detect light reflected from the card, and a timing circuit that reads the states of the sensors each time a column of boxes is centered under the sensors.

In actual practice, markable cards are often marked in an imprecise manner. The marks often do not fill even half of the area within a box, but instead may consist of a few or even one relatively fine line such as may be made by a ball-point pen or a pencil. Also, such a line may occupy a wide range of positions within one of the boxes on the card. Where a pencil marking is made, it may be erased in a manner that leaves a smudge which partially darkens a box area that was intended to be left blank. Attempts could be made to educate the persons marking the card to always fill the entire box, but such efforts would often be unproductive since the main advantage of marked cards is that they can be filled in by occasional users. If a card reader were available which could reliably read marks that occuppied only a small portion of any box area and that had any location within a wide range of positions within the box, while being insensitive to smudges and the like that result from erasures, then more reliable readout of marked cards could be attained. Additionally, even constant card users would not have to take the time required to fill the entire boxes and therefore could mark the cards more rapidly.

SUMMARY OF THE INVENTION

In accordance with one embodiment of the present invention, a card reader is provided which can reliably sense marks having a wide tolerance as to thickness and position while discriminating against erasure smudges and other unintentional markings. The reader includes a row of light sensors extending along the width of the card path, each sensor viewing a narrow region at the card path such as a region having a thickness along the card path equal to the thickness of a line made by a fine point pen. A group of memories is connected to the sensors, each memory changing from a reset condition to a set condition when its corresponding sensor detects a mark. A timing system reads out all of the memories after each column of boxes on the card has passed the row of sensors. The timing system then resets all of the memories prior to the next row of boxes reaching a position to be viewed by the sensors.

The timing system includes a row of strobe markings printed or punched in the card near one side thereof. The strobe markings have column positions in between the columns of markable boxes. A strobe sensor which senses the strobe marks generates a strobe signal that reads out all of the memories and which passes through a delay circuit for thereafter resetting the memories.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2, 3, 4:
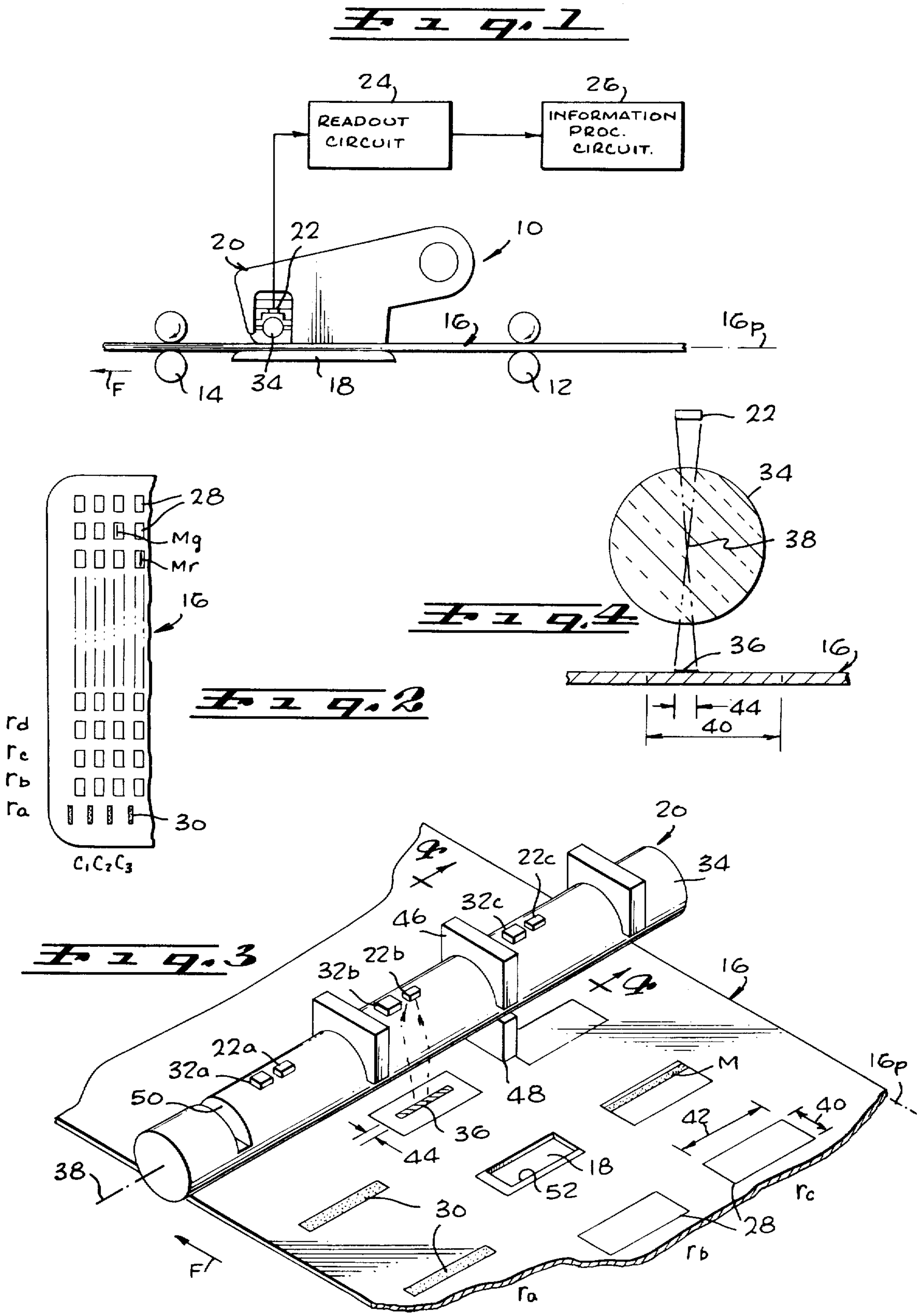
FIG. 1 is a partial side elevation view of a card reader constructed in accordance with the present invention.
FIG. 2 is a partial plan view of a markable card constructed in accordance with the present invention.
FIG. 3 is a partial perspective view of the readout station of the reader of FIG. 1.
FIG. 4 is a view taken on the line 4—4 of FIG. 3.

FIG. 1 illustrates the general arrangement of the card reader near the readout station 10 thereof, the card reader including a series of rollers 12, 14 for moving a card 16 at a predetermined speed in the direction of arrow F along a predetermined card path 16*p* past the readout station. At the readout station 10, the card passes between a backup plate 18 and a head assembly 20. The head assembly includes sensors 22 that sense the presence of punched or marked holes and which deliver signals to a readout circuit 24. The readout circuit is connected to an information processing circuit 26 which may be a computer that further processes information represented by the card markings.

FIG. 2 illustrates the appearance of the front portion of the card 16 which is designed to be read out by the card reader. The card has small boxes 28 printed thereon and arranged in rows and columns. The boxes 28 are boundary markings indicating the area where encoding should be performed, such encoding usually being accomplished by placing pencil or pen marks therein or by punching the card thereat. The card defines a group of row positions labeled $r_a$, $r_b$, $r_c$, etc., spaced laterally or in other words along the width of the card, and also defines column positions $c_1$, $c_2$, etc., spaced along the length of the card. One type of card has twelve row positions and forty column positions, although these numbers can obviously be varied. The lowermost row position $r_a$ is occupied by strobe markings 30 whose function will be described below. The card reader can read marks that occupy an entire box 28, and also can read marks such as those illustrated at $M_q$ and $M_r$ that occupy only a small portion of a box and which may be placed at a wide range of positions within the box.

FIGS. 3 and 4 illustrate details of the readout head 20 and card 16. The row of sensors 22 includes individual sensors 22*a*, 22*b*, 22*c*, etc., each positioned opposite a different row position $r_a$, $r_b$, $r_c$, etc., of the card. A row of light sources 32 is also provided which include an individual light emitting diode or other light source 32*a*, 32*b*, 32*c*, etc., each light source positioned adjacent to a light sensor to illuminate an area of the card which is "viewed" by the sensor. A cylindrical lens 34 is positioned between each sensor-source pair to concentrate light from the light source onto the card and to concentrate light from a small area of the card onto the sensor. The lens 34 also serves an important function of passing light from only a very limited region 36 at the card path onto a corresponding sensor.

An understanding of how light from only the limited card path region 36 is concentrated onto the sensor 22, can be gained from FIG. 4. The lens 34 is curved along a direction perpendicular to its axis 38, so that with respect to the length of the card path, the lens can focus light and form an image. The lens 34 is positioned so that the face of the sensor 22 and the card path region 36 are at conjugate foci of the lens. Accordingly, with respect to the view of FIG. 4, an image of the card area 36 is formed on the sensor 22. Both the card path and sensor are spaced from the lens by approximately the same amount, so that the viewed region 36 at the card path is approximately the same size as the sensor 22. The sensor 22 is of small dimension along the length of the card path, so that the length 44 along the card path, or thickness, of the area 36 which is viewed by the sensor is also very small.

Each of the markable boxes 28 has a thickness 40 (FIG. 3) along the length of the card path and a width 42 along the width of the card path which are just large enough to facilitate the placement of marks therein, a typical thickness 40 being one-tenth inch and a typical width 42 being one-fifth inch in one type of card. The sensor 22 and viewed region 36 have a small thickness 44 along the card path, such as twenty-thousandths inch. Thus, the thickness of the viewed region is less than one-half the thickness of the markable box, and is preferably less than one-fourth as great. The narrow thickness 44 of the viewed region 36 permits highly sensitive detection of marks. A line drawn by a typical ball point pen usually has a thickness of more than twenty-thousandths inch. Thus, the mark resulting from a single stroke of such a pen can create an "image" that completely covers the sensor 22. Accordingly, the sensor can detect a very narrow mark which covers only a small portion of the thickness of the box 28. Even if the mark from a pen is somewhat narrower than the viewed region 36, it can be detected because its image can cover a high proportion of the sensor 22. The sensor 22 is not highly sensitive to smudge or erasure marks which may cover the entire markable box 28, where no part of the smudge is very dark.

The viewed region 36 does not have a sharply defined width along the width of the card path, but the sensitivity is high along a width dimension much greater than the thickness dimension 44. The fact that the boxes 28 have a much greater width dimension 42 than their thickness dimension encourages persons to orient their marks primarily parallel to the width of the card path, so that even a relatively thin mark occupies a high proportion of the area 36 viewed by the sensor. The readout head 20 is also provided with baffles 46, 48, the upper baffles 46 lying in slots 50 of the cylindrical lens. The baffles limit the width of the viewed region 36 and also limit the amount of sideward illumination created by the light sources 32.

The sensors 22 can detect holes such as the hole 52, because the backup plate 18 (FIG. 1) below the card is formed to not reflect light, as by utilizing a backup plate surface of black color or which is provided with a row of holes under the source/sensor area. In order to prevent the preprinted box outlines 28 from being detected as marks, they are printed with a red ink and the light sources 32 are light emitting diodes of a type that generates red light.

The sensor 22 are therefore sensitive to marks that occupy only a small area of the boxes 28, and particularly to marks that occupy a wide but thin region 36 that can lie within a box. It is also possible to construct the card reader so that each sensor is sensitive to an area that is of narrow width along the card path, although this requires a high intensity of card illumination or more sensitive light sensor circuits, and also requires that the lens 34 be curved in two directions. It should be appreciated that a variety of devices can be used instead of the lens 34 to limit the region viewed by the sensors, including a mask with small holes through which light can reach the sensors or optical fibers for carrying light from a small card region to each sensor.

Figure 5:
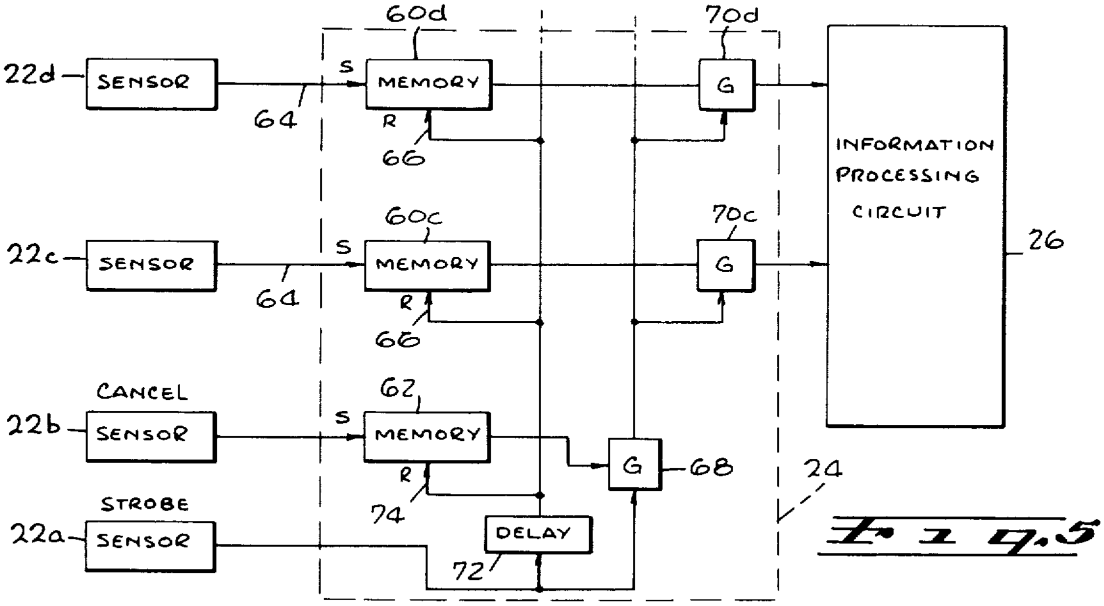
FIG. 5 is a highly simplified block diagram view of the card reader of FIG. 1.

The thin marks M which a person places on the card, can be positioned within a wide range of locations in the boxes 28. As a result, a sensor may detect a mark and therefore generate a pulse, at any time while a box 28 occupies the viewed region 36. This indefinateness of pulse time prevents the use of a typical prior art readout circuit which merely reads the states of all of the sensors at a time when the markable boxes are centered under the sensors. Instead, a circuit of the type illustrated in FIG. 5 is utilized. The readout circuit 24 in FIG. 5 includes a group of memories 60*c*, 60*d*, etc., each corresponding to one of the sensors 22*c*, 22*d*, etc. that detect ordinary information entered on the card and which may be referred to as information sensors. No memory is provided for the first sensor 22*a* which senses strobe markings on the card, and a different memory 62 is provided for the second sensor 22*b* in order to utilize it for a special cancel function which will be described below.

When one of the information sensors such as 22*c* detects the presence of a mark, it delivers a pulse to a set input 64 of its corresponding memory 60*c*, to set the memory. The memory 60*c* is a binary type and includes another input 66 which can receive a pulse to reset the memory. After each column of markable boxes on the card has completely passed by the information sensors 22*c*, 22*d*, etc., the first sensor 22*a* senses a strobe marking 30 on the card. The sensor 22*a* then delivers a pulse through a normally open gate 68 to a group of readout gates 70*c*, 70*d*, etc. The gates 70 are normally closed, but the strobe pulse opens them briefly so that signals from the information memories 60*c*, 60*d*, etc., can pass through the gate to the information processing circuit 26. The strobe sensor therefore provides a timing means for generating strobe pulses, while the gates 70*c*, 70*d*, etc., provide a readout means for reading out the memories in synchronism with the strobe pulses.

The strobe pulse from the sensor 22*a* also passes through a short delay circuit 72 which is connected to the reset inputs 66 of the information memories 60*c*, 60*d*, etc., to reset the memories. This resetting occurs prior to the next column of boxes arriving under the information sensors 22*c*, 22*d*, etc. Thus, whenever one of the information sensors 22*c*, 22*d*, etc., is covered by the image of a mark, it sets its corresponding memory 60. Only after the markable boxes have passed completely across the information sensors are the memories read out. Then, prior to the next row of boxes reaching the information sensors, the memories are all reset to prepare them for another entry.

The strobe sensor 22*a* is physically of the same type as the other sensors. However, the strobe markings 30

(FIG. 2) which it can sense are positioned in between the columns of boxes 28. Thus, a strobe marking 30 is sensed and a strobe pulse is generated at a time when there are no boxes under the information sensors that should be read. The strobe markings 30 can be printed on the card or can be punched therein so that they are holes in the card. If the strobe sensor 22*a* is positioned so it is not in line with the row of information sensors 22*c*, 22*d*, etc., then the column positions of the strobe markings should be correspondingly shifted, but the strobe markings are always in a constant column phase relationship or column position with respect to the box-like encoding areas.

The second sensor 22*b* is utilized as a cancel device to enable a person to cancel the readout of a column of boxes. Where a mistaken entry has been placed in one column of boxes, the readout of that column can be prevented by placing a mark in the box at the second row position $r_b$ which is read by the cancel sensor 22*b*. When the cancel sensor 22*b* senses a mark, it sets its memory 62 so that the memory closes the gate 68. At rhe next strobe pulse, when the information memories 60*c*, 60*d*, etc., would normally be read out, no such readout occurs because the strobe pulse cannot pass through the gate 68 to open the gates 70*c*, 70*d*, etc. A short time after each strobe pulse, a pulse is delivered over line 74 to a reset input of the cancel memory 62 to reset it so that the gate 68 will again open.

Figure 6:
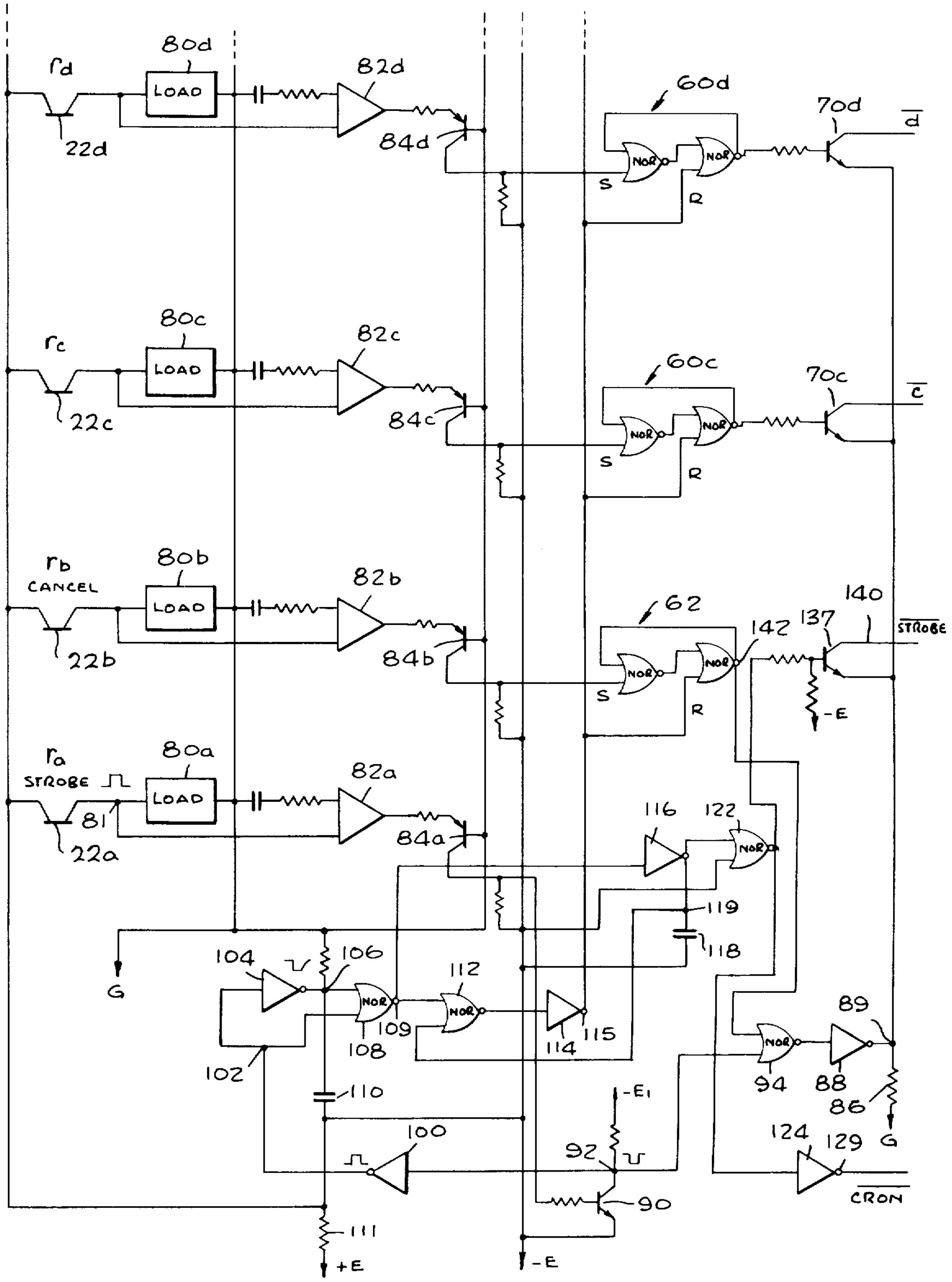
FIG. 6 is a circuit diagram of the circuit of FIG 5.

Details of the circuit of FIG. 5 are provided in the schematic diagram of FIG. 6. Each of the sensors 22*a*, etc., is a phototransistor with one terminal connected to a voltage source +E and the other terminal connected through a load 80*a*, 80*b*, etc., to another voltage source G (which represents a ground potential inbetween −E and +E). When a phototransistor 22 becomes darkened by the image of a mark thereon, its resistance increases and the current therethrough decreases. This decrease in current is sensed by a corresponding operational amplifier 82*a*, 82*b*, etc., which then generates a current that turns on a corresponding transistor 84*a*, 84*b*, etc. The collector of the transistors 84*b*, 84*c*, 84*d*, etc., are connected to the set input of corresponding flip-flop memories 62 and 60*c*, 60*d*, etc. The information memories 60*c*, 60*d* are connected through transistor gates 70*c*, 70*d*, etc., to the information processing circuit. Each of the transistor gates 70*c*, 70*d*, etc., is kept off by reason of its collector being connected to a point 89 which is connected through a resistor 86 to the voltage source G. However, when an inverting operational amplifier 88 is operated to connect the point 89 to a more negative voltage source, all of the transistors 70*c*, 70*d*, etc., whose gates are "high" can turn on to deliver a negative pulse to the processing circuit.

Figure 7:
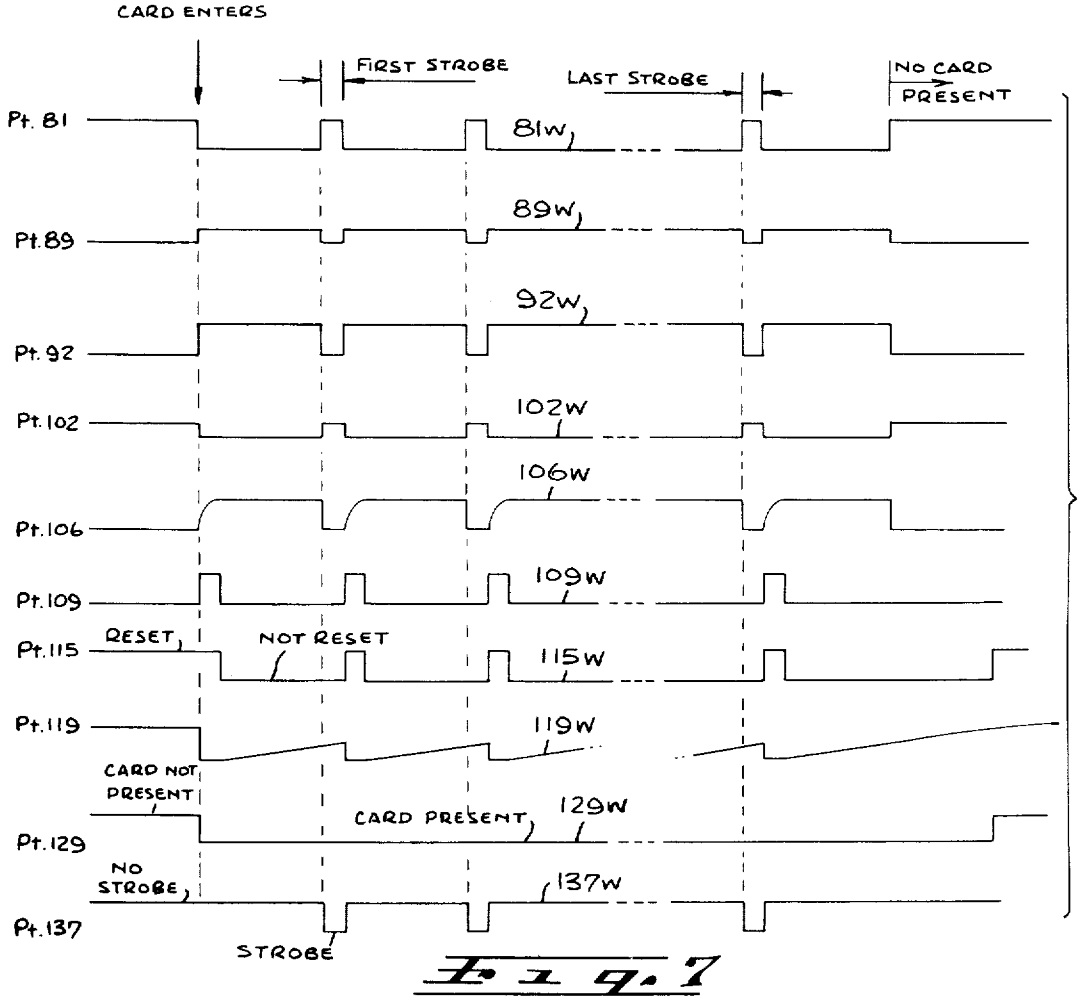
FIG. 7 is a representation of the waveforms at various points of the circuit of FIG. 6.

FIG. 7 illustrates waveforms at various points in the circuit of FIG. 6, showing how the voltages respond to the strobe sensor 22*a* whose output, at point 81 in the circuit, is represented by the waveform 81*w*. The readout of all memories through gates 70*c*, 70*d*, etc., when a card is present in the reader, occurs when point 89 goes low, which occurs in synchronism with the strobe pulses as indicated by waveform 89*w*. In the circuit of FIG. 6, this results from the fact that the sensing of a strobe pulse causes point 81 to go high, so that amplifier 82*a* turns on transistors 84*a* and 90 to cause point 92 to go low, as shown in the waveform 92*w*. The point 92 is connected to a NOR gate 94 which operates the inverting amplifier 88 whose output is at the point 89. As previously mentioned, during the sensing of a strobe mark the point 89 goes low to allow all transistors 70*c*, 70*d*, etc., to pass a signal from corresponding memories to the processing circuit.

The resetting of the memories is accomplished by a circuit portion connected to the point 92. This circuit portion includes an inverting amplifier 100 whose output at 102 is connected directly to one input of a NOR gate 108, and whose output at 102 is also connected through another inverting amplifier 104 to another input 106 of the NOR gate 108. The waveform at point 102 is shown at 102*w* (FIG. 7) to go high during each strobe. The waveform at 106 goes low during each strobe but does not immediately become high at the end of each strobe. This is because a capacitor 110 and resistor 111 connect the point 106 to the voltage source +E. As a result, at the end of each strobe pulse, the voltage at 106 rises exponentially as shown at 106*w*, and therefore it requires a definite delay time before the voltage becomes high enough to be sensed as a high level by the NOR gate 108. Therefore, the NOR gate 108 has two negative inputs for a short time following each strobe pulse, and during these times its output at point 109 is high. Thus, the waveform 109*w* at point 109 is high only for a brief time following each strobe pulse.

The point 109 is connected through a NOR gate 112 and inverting amplifier 114 whose output point 115 serves as the reset line. As shown at 115*w* in FIG. 7, the point 115 is high, and therefore resets all of the memories, during a brief period following each strobe pulse, each reset period ending when the capacitor 110 has been sufficiently charged. The value of capacitor 110 is chosen to provide a small delay which is only a small fraction of the time between successive strobe pulses. Thus, all of the memories are automatically reset after each strobe pulse.

Another function which must be generated by the circuit of FIG. 6 is a function that indicates the presence or absence of a card in the card reader. This is accomplished by a circuit portion which includes an inverting amplifier 116 whose input is connected to point 109 and whose output is at point 119. Point 119 is connected through a large capacitor 118 to voltage source −E so that it requires an appreciable time to raise the voltage at point 119. The voltage at 118 can, however, be rapidly decreased by the amplifier 116, which is a type such as integrated circuit type 7416 manufactured by Fairchild Camera and Instrument Company and by Motorola, Inc., which can carry a large reverse current from its output to a negative voltage source. As shown in the waveform 119*w*, point 119 is high prior to a card entering the card reader. As soon as the card enters and point 109 goes high, point 119 goes low and then begins to charge towards a high level. However, the charging time (the term "charging" refers to change of the voltage across a capacitor either by charging or discharging it) is longer than the time between strobe pulses, so that point 119 never reaches a high level, but is repeatedly reduced to a low level following each strobe pulse. After the last strobe pulse point 119 continues to charge, and after a time it reaches a high level. The high level is reached about the time that the card leaves the sensing station of the card reader. The point 119 is connected through a NOR gate 122 and an inverting amplifier 124 whose output at point 129 is shown at 129*w* in FIG. 7. Point 129 is high prior to a card entering the readout station of the card reader, remains low while a card is present and then becomes high again about the time the card leaves. The signal at 129 is delivered to the computer or other processing circuit to indicate when the reader is ready to deliver information.

Signals representing whether a card is present or not are utilized in two other ways. The output of NOR gate 122 is also delivered to the gate of a transistor 137 to allow it to turn on the transistor only during the time when a card is present. The emitter of transistor 137 is connected to the point 89 which generates a negative pulse at each strobe signal, so that the transistor 137 is turned on to deliver strobe pulses over line 140 to a computer or other processing circuit only during the time when a card is present. Another way in which the signal indicating the presence of a card is utilized, is to keep all of the memories in a reset condition when a card is not present. The fact that the point 119 is always high when a card is not present means that point 115 is kept high to keep all memories in a reset condition when no card is present. The maintaining of all memories in a reset condition when no card is present prevents the delivery of information-indicating signals through the gates 70*c*, 70*d*, etc., when no card is present and assures that all of the information memories are in a reset condition when the first strobe occurs. The circuit of FIG. 6 has several outputs labelled $\overline{\text{CRON}}$, $\overline{\text{STROBE}}$, $\overline{c}$, $\overline{d}$, etc., respectively representing the presence of a card, a strobe pulse, and the detection of marks at the various row positions $r_c$, $r_d$, etc. A bar over each output designation indicates that the low condition of the signal represents a card present, a strobe pulse, or mark sensings.

The cancel sensor 22*b* serves to prevent the delivery of information pulses from the information memories if a cancel mark has been sensed. The sensing of a mark at the cancel row causes the transistor 84*b* to be turned on, which results in setting of the cancel memory 62. When the cancel memory 62 is set, point 142 at the output of the cancel memory becomes high and it inhibits and strobe sensor are chosen so that the strobe markings are detected at times when the columns of markable boxes are not opposite the information sensors. The output of the strobe sensor is also processed to generate a signal indicating the presence of a card.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A card reading system comprising:

a card printed with boundary indications that define markable areas arranged in spaced columns and rows, each markable area having a predetermined maximum thickness along the card path;

means for moving said card along a predetermined card path;

a plurality of spaced information sensors disposed along said card path, each sensor responsive to light substantially only within a viewed region of the card path which has a thickness along the length of the card path of less than one-half the thickness of each of said markable areas;

a plurality of memories, each changeable from a first state to a second state in response to a corresponding sensor sensing a mark;

means for reading out said memories at times when the card is positioned so that the regions viewed by the sensors are between columns of markable card areas; and resetting means for placing said memories in said first state after they are read out and before the next column of markable areas reaches the regions viewed by the sensors.

2. The card reader system described in claim 1 wherein:

each markable area on the card has a width along the width of the card path which is greater than its thickness along the length of the card path, to encourage any pen marking to extend along the width of the card path; and each of said viewed regions has a thickness along the length of the card path which is less than one-fourth the thickness of each markable area.

3. A card reading system comprising:

a card printed with boxes arranged in columns and rows, and containing a row of strobe encodings;

means for moving the card along a predetermined card path;

means for illuminating a portion of the card path;

a column of light sensors spaced from the card path;

a cylindrical lens extending along the width of the card path between the sensors and card path, said lens focusing light from only a corresponding viewed region of the card path onto each sensor, each viewed region having a thickness along the length of the card path less than one-fourth the thickness of each box along the card path, so that each sensor can generate a pulse in response to a thin mark:

a plurality of memories each setable in response to a corresponding sensor sensing a mark and each being resetable;

a plurality of gate means for passing a signal of a binary level dependent upon the state of a corresponding memory; and timing means for opening said gate means and then resetting the memories inbetween successive columns of boxes lying at the viewed regions.

4. Card and reader apparatus comprising:

a card for moving along a card path, said card having markable encoding areas arranged in rows extending along the length of the card path and in columns extending along the width of the card path, and having strobe encodings spaced along a predetermined row position and at a constant column position with respect to said markable encoding areas;

means for moving said card along a predetermined card path;

a plurality of information sensor means spaced laterally from one another along the width of the card path for sensing the presence of encoding at predetermined locations at the card path;

a plurality of memories, each operable from a reset state to a set state in response to a corresponding sensor sensing the presence of an encoding;

timing means including a strobe sensor for sensing said strobe encodings of said card, for generating strobe signals in synchronism with the movement of said card past said information sensors;

readout means coupled to said timing means for reading out the memories in synchronism with said strobe signals; and delay means for repeatedly resetting all of said memories, each resetting occurring at a time after said readout means reads out the memories.

5. The apparatus described in claim 4 wherein:

said timing means includes card indicator means for generating a first signal indicating the presence of a card and a second signal indicating the absence of a card, said card indicator means including a capacitor, means for slowly charging the capacitor towards a first voltage between successive strobe signals and for rapidly discharging the capacitor at each strobe signal, and a logic circuit responsive to the voltage across the capacitor for generating said first signal until the capacitor is charged by the resistor to a predetermined level, said capacitor being large enough that it does not charge to said predetermined level until the end of a charging period which is greater than the normal time between successive strobe pulses.

6. A card reading system comprising:

a card printed with boundary indications that define markable areas arranged in spaced columns and rows, each markable area having a predetermined maximum thickness along the card path, said card also having a row of strobe encodings;

means for moving said card along a predetermined card path;

a column of information sensors disposed along said card path, each sensor responsive to light substantially only within a viewed region of the card path which has a thickness along the card path of less than one-half the thickness of each of said markable areas;

a plurality of memories, each changeable from a first state to a second state in response to a corresponding sensor sensing a mark;

means for reading out said memories at times when the card is positioned so that the regions viewed by the sensors are between columns of markable card areas, including a strobe sensor positioned to sense said strobe encodings, said strobe sensor and strobe encodings being positioned so that the strobe encodings are sensed at times when the regions viewed by the information sensors are between columns of markable areas; and resetting means for placing said memories in said first state after they are read out and before the next column of markable areas reaches the regions viewed by the sensors.

7. A card reading system comprising:

a card printed with boundary indications that define markable areas arranged in spaced columns and rows, each markable area having a predetermined maximum thickness along the card path;

means for moving said card along a predetermined card path;

a column of information sensors disposed along said card path, each sensor responsive to light from one row of markable areas;

a plurality of memories, each changeable from a first state to a second state in response to a corresponding sensor sensing a mark;

means for reading out said memories at times when the card is positioned so that the regions viewed by the sensors are between columns of markable card areas;

resetting means for placing said memories in said first state after they are read out and before the next column of markable areas reaches the regions viewed by the sensors;

a cancel sensor positioned to sense marks at a predetermined row position;

a cancel memory changeable from a first state to a second state in response to the sensing of a mark, and changeable to a first state by said resetting means; and means responsive to said cancel memory, for disabling said reading out means so it cannot read out said memories until after the next column of encoding areas has passed the viewed regions.

8. A card reading system comprising:

a card printed with boundary indications that define markable areas arranged in spaced columns and rows, said card also having a row of strobe encodings;

means for moving said card along a predetermined card path;

a column of information sensors disposed along said card path, each sensor responsive to light from a corresponding row of said markable areas;

a plurality of memories, each changeable from a first state to a second state in response to a corresponding sensor sensing a mark;

means for reading out said memories at times when the card is positioned so that the regions viewed by the sensors are between columns of markable card areas, including a strobe sensor positioned to sense said strobe encodings;

resetting means for placing said memories in said first state after they are read out and before the next column of markable areas reaches the regions viewed by the sensors; and means responsive to the strobe sensor repetitively sensing strobe markings for generating a constant signal indicating the presence of a card.

* * * * *